United States Patent
Hamilton et al.

(10) Patent No.: US 11,186,337 B1
(45) Date of Patent: Nov. 30, 2021

(54) RETAINING ASSEMBLY TO ATTACH ONE OR MORE MOBILE DEVICES TO A MOBILE OBJECT

(71) Applicants: Leslie Ronald Hamilton, Monterey, CA (US); John Carr, Gilroy, CA (US)

(72) Inventors: Leslie Ronald Hamilton, Monterey, CA (US); John Carr, Gilroy, CA (US)

(*) Notice: Subject to any disclaimer, the term of this patent is extended or adjusted under 35 U.S.C. 154(b) by 0 days.

(21) Appl. No.: 17/249,874

(22) Filed: Mar. 17, 2021

Related U.S. Application Data

(63) Continuation of application No. 15/929,936, filed on May 29, 2020, now Pat. No. 10,988,197.

(51) Int. Cl.
| | |
|---|---|
| *B62J 11/00* | (2020.01) |
| *B60R 11/02* | (2006.01) |
| *F16B 2/10* | (2006.01) |
| *F16B 1/00* | (2006.01) |
| *B60R 11/00* | (2006.01) |

(52) U.S. Cl.
CPC .......... *B62J 11/00* (2013.01); *B60R 11/0241* (2013.01); *B60R 11/0252* (2013.01); *F16B 1/00* (2013.01); *F16B 2/10* (2013.01); *B60R 2011/001* (2013.01); *F16B 2001/0035* (2013.01)

(58) Field of Classification Search
CPC .. B62J 11/00; B60R 11/0241; B60R 11/0252; B60R 2011/001; F16B 1/00; F16B 2/10; F16B 2001/0035; F16B 2200/30; F16B 5/0052; E04B 2/8641
See application file for complete search history.

(56) References Cited

U.S. PATENT DOCUMENTS

| | | | | |
|---|---|---|---|---|
| 2,974,918 A | * | 3/1961 | Voigtlander | A47B 57/46 248/201 |
| 3,090,086 A | * | 5/1963 | Fata | F16B 12/24 403/381 |
| 5,992,807 A | * | 11/1999 | Tarulli | B60R 11/0241 248/205.3 |
| 8,662,362 B1 | * | 3/2014 | Bastian | H04B 1/3888 224/218 |
| 8,706,175 B2 | * | 4/2014 | Cho | F16M 13/022 455/575.8 |
| 8,794,682 B2 | * | 8/2014 | Fiedler | E05B 15/04 292/251.5 |
| 9,427,070 B1 | * | 8/2016 | Bastian | A45F 5/021 |
| 9,505,355 B1 | * | 11/2016 | Cho | F16M 11/14 |
| 9,616,821 B2 | * | 4/2017 | Elharar | F16M 13/022 |
| 9,616,822 B1 | * | 4/2017 | Hamilton | B60R 11/02 |
| 9,787,348 B2 | * | 10/2017 | Srour | H04M 1/15 |
| 10,422,474 B2 | * | 9/2019 | Bacallao | F16M 13/022 |
| 10,694,835 B2 | * | 6/2020 | Peterson | A45C 11/00 |

* cited by examiner

*Primary Examiner* — Anita M King
(74) *Attorney, Agent, or Firm* — Dunlap Bennett & Ludwig, PLLC

(57) ABSTRACT

A retaining assembly to attach one or more mobile devices to a mobile object. The retaining assembly may include a mounting plate that attaches to the mobile object by way of a mounting bracket or scorecard clip-on. The mounting bracket provides dovetails for selecting engaging the mounting plate in different orientations. The mounting plate facilitates various magnetized components to removably attach to the mobile device. If the mobile device has a third-party extensible grip, a retaining ring may be employed to attach the mobile device or the extensible grip modified to one of the various magnetized components.

8 Claims, 11 Drawing Sheets

RETAINING ASSEMBLY TO ATTACH ONE OR MORE MOBILE DEVICES TO A MOBILE OBJECT

CROSS-REFERENCE TO RELATED APPLICATION

This application claims the benefit of priority of U.S. Non-provisional application Ser. No. 15/929,936, filed 29 May 2020, the contents of which are herein incorporated by reference.

BACKGROUND OF THE INVENTION

The present invention relates to retaining devices and, more particularly, to a retaining assembly to attach one or more mobile devices to a mobile object.

Golfers, bikers or parents or anyone moving around with a mobile object, such as their golf cart, buggy, bicycle, and/or the like, typically carry with them one or more electronic devices, such as a mobile phone, tablets, range finder, GPS device and/or the like. The users of these mobile objects currently do not have a convenient place to hold their electronic device(s) and so usually transport them unsecured in a cup holder or other makeshift locations on the mobile object.

Many current solutions are designed for an automobile, requiring the sacrifice of one of the cup holders of the other mobile object, which may not hold the mobile device securely. Or these automobile-based retaining devices, require the use of bracket attached to an inconvenient location such as along the windshield frame. In short, there is no solution that permits attachment without modifications to either the mobile device or the other mobile object. Such modifications require time to attach/detach and may damage or otherwise diminish the value of the other mobile object. Moreover, the location may be inconvenient, not keeping the mobile device in a handy location. Furthermore, many mobile device users attach a third-party, extensible grip, such as a Popsocket™, to their mobile device which results in a projection on the rear of the mobile device that causes a lack of fit with current retaining solutions.

As can be seen, there is a need for a retaining assembly to attach one or more mobile devices to a mobile object for safe attachment thereto without any permanent modifications to the mobile device or mobile object.

In one embodiment, the present invention, holds one or two mobile devices to the mobile object through a mounting plate that facilitates various magnetized components to removably attachment to the mobile device or the above-mentioned extensible grip; thereby, providing a convenient, visible location for the mobile device(s). There are variants of the appliance that provide the opportunity to attach two devices such as a mobile phone and a range finder with or without the extensible grip to the mobile device/first object.

In one embodiment of the present invention, the mobile object is a cart, carriage or bicycle with handles, and the retaining assembly secures one or two mobile devices to a handle or frame of the cart or carriage.

In another embodiment of the retaining assembly, the scorecard clip on the golf cart steering wheel is used to hold the present invention in place using specific features of the retaining assembly. The one or more mobile devices are held securely in the center of the steering wheel so that the one or more mobile devices can be viewed readily and used conveniently or dismounted quickly if required.

The present invention provides a simple low-cost method to quickly attach/detach one or more mobile devices to the mobile object without modifications to the mobile object. The present invention may be a solution for a family of devices such as mobile phones/rangefinders/cameras/scorekeepers (for golfers). Additional features may enhance the extensible grip-adapted device, essentially converting the extensible grip to a magnetic attached device. A total of eleven variants have been identified to date with other configurations possible.

The present invention generally includes one or two static components and an adaptive retaining component for hold the mobile device(s). The static component is either a first base that attaches to the steering wheel of a golf cart or attaches to a second component which attaches to a golf buggy/child buggy/wheelchair/bicycle/scooter/shopping cart either by a screw clamp or hook and loop straps or other convenient holding mechanism. The static component has variants to hold one or two devices.

The second retaining component is either a pair of moving or static gripping jaws, an extensible grip, and enhanced magnetic extensible grip, or embedded magnets in the retaining component. In some instances, the second component may be used without the first component if a suitable ferromagnetic target is available.

SUMMARY OF THE INVENTION

In one aspect of the present invention, a retaining assembly for one or more mobile devices fitted with an extensible grip includes the following: a mounting plate providing at least one ferromagnetic portion or a retaining ring along an upper surface, wherein the retaining ring is dimensioned to engage a portion of a periphery of the extensible grip, and wherein each ferromagnetic portion is adapted to magnetically connect to the extensible grip through one of a plurality of magnetized components.

In another aspect of the present invention a first magnetized component of the plurality of magnetized components includes a rare magnet coupled to a distal end of the extensible grip by way of a removable cover; the second magnetized component of the plurality of magnetized components includes: a magnet coupled to a grip configuration; and the grip configuration having a pair of spaced apart fingers for engaging a periphery of one mobile device; or a third magnetized component of the plurality of magnetized components includes a rare earth magnet with one surface thereof having a contact adhesive fixed to the extensible grip.

In yet another aspect of the present invention a mounting bracket includes the following: a tapered dovetail; the mounting plate having two tapered dovetail grooves along a lower surface thereof; and each tapered dovetail groove having a transverse orientation relative to each, wherein the mounting plate provides a pair of ferromagnetic portions and retaining rings, wherein each retaining ring partially circumscribes the respective ferromagnetic portion or extensible grip, or wherein the mounting plate provides one ferromagnetic portion and one retaining ring, wherein said retaining ring partially circumscribes said extensible grip.

These and other features, aspects and advantages of the present invention will become better understood with reference to the following drawings, description and claims.

DETAILED DESCRIPTION OF THE INVENTION

Figure 1:
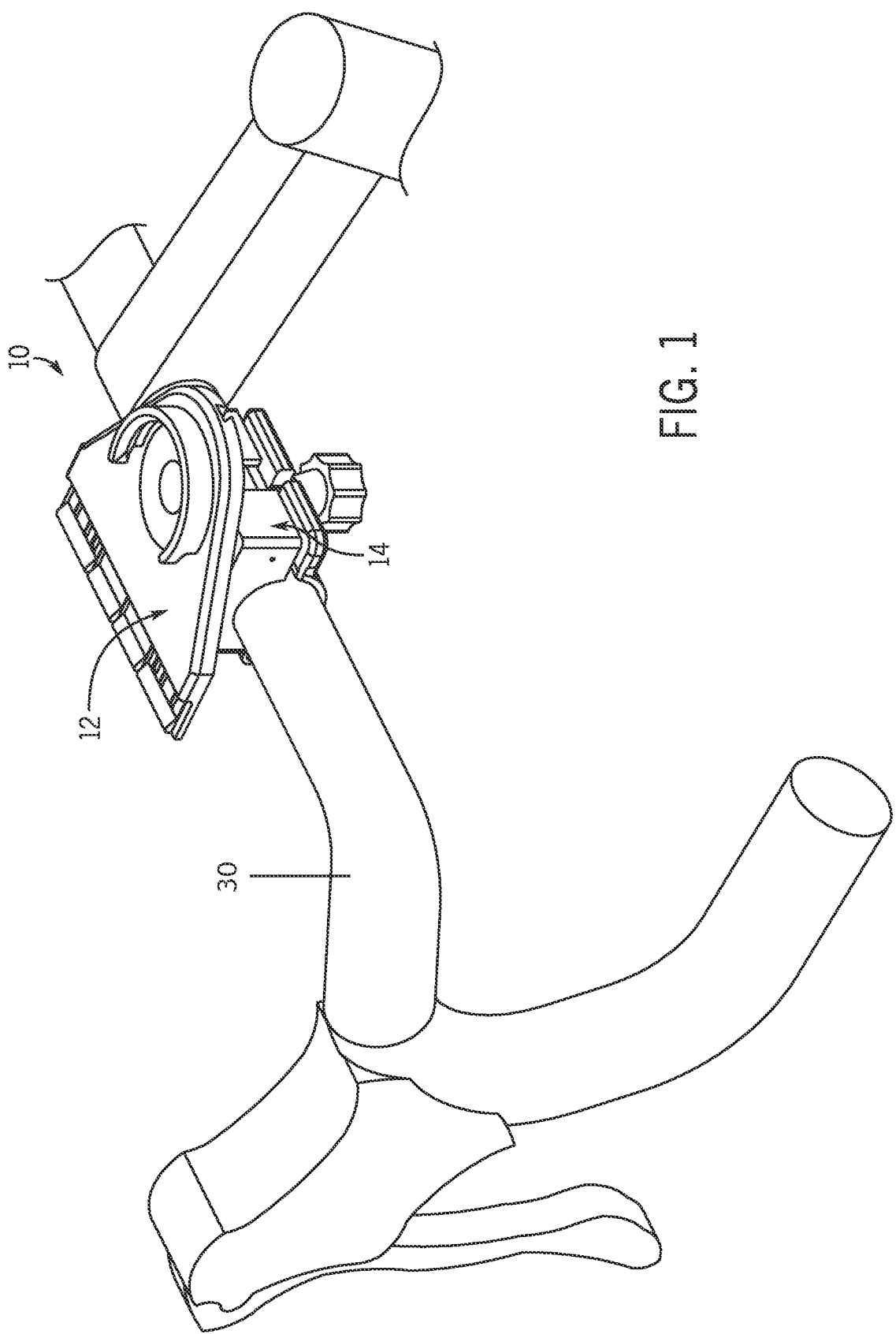
FIG. 1 is a front perspective view of an exemplary embodiment of the present invention, shown in use.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a retaining assembly to attach one or more mobile devices to a mobile object. The retaining assembly may include a mounting plate that attaches to the mobile object by way of a mounting bracket or scorecard clip. The mounting bracket provides a dovetail for selecting engaging the mounting plate in different orientations. The mounting plate facilitates various magnetized components to removably attach to the mobile device. If the mobile device has a third-party extensible grip, the retaining assembly may convert the extensible grip to one of these magnetized components or engage the extensible grip directly through a retaining ring.

Referring to FIGS. 1 through 14, the present invention may include a retaining assembly 10 for removably attaching a first object 28 to a second object 30. The retaining assembly 10 may include a mounting plate 12/40/42 for removably attaching to the first object 28 and a mounting bracket 14 or 34 for removably attaching to the second object 30.

The mounting bracket 14 may include an upper portion 14a and a lower portion 14b operatively associated by way of an actuator 26 in such a way that the upper and lower portions 14a and 14b move relative to each other. The actuator 26 may provide a locking element for transitioning between an unlocked engagement and a locked engagement, preventing the upper and lower portions 14a and 14b from moving relative to each other. The actuator 26 may be a swivel hold-down clamp that, in part, fits within a bracket slot 14d formed in the upper portion 14a.

The upper and lower portions 14a and 14b may share a pivotable connection 14c. As a result, the upper and lower portions 14a and 14b may be pivoted relative to each other to engage the second object 30 on opposing sides thereof, from which engagement the actuator 26 further clamps the upper and lower portions 14a and 14b down on the second object 30 until a locking engagement is desired. The mounting bracket 14 may provide a void in one or both of the upper and lower portions 14a and 14b for receiving a portion of the second object 30.

Figure 2:
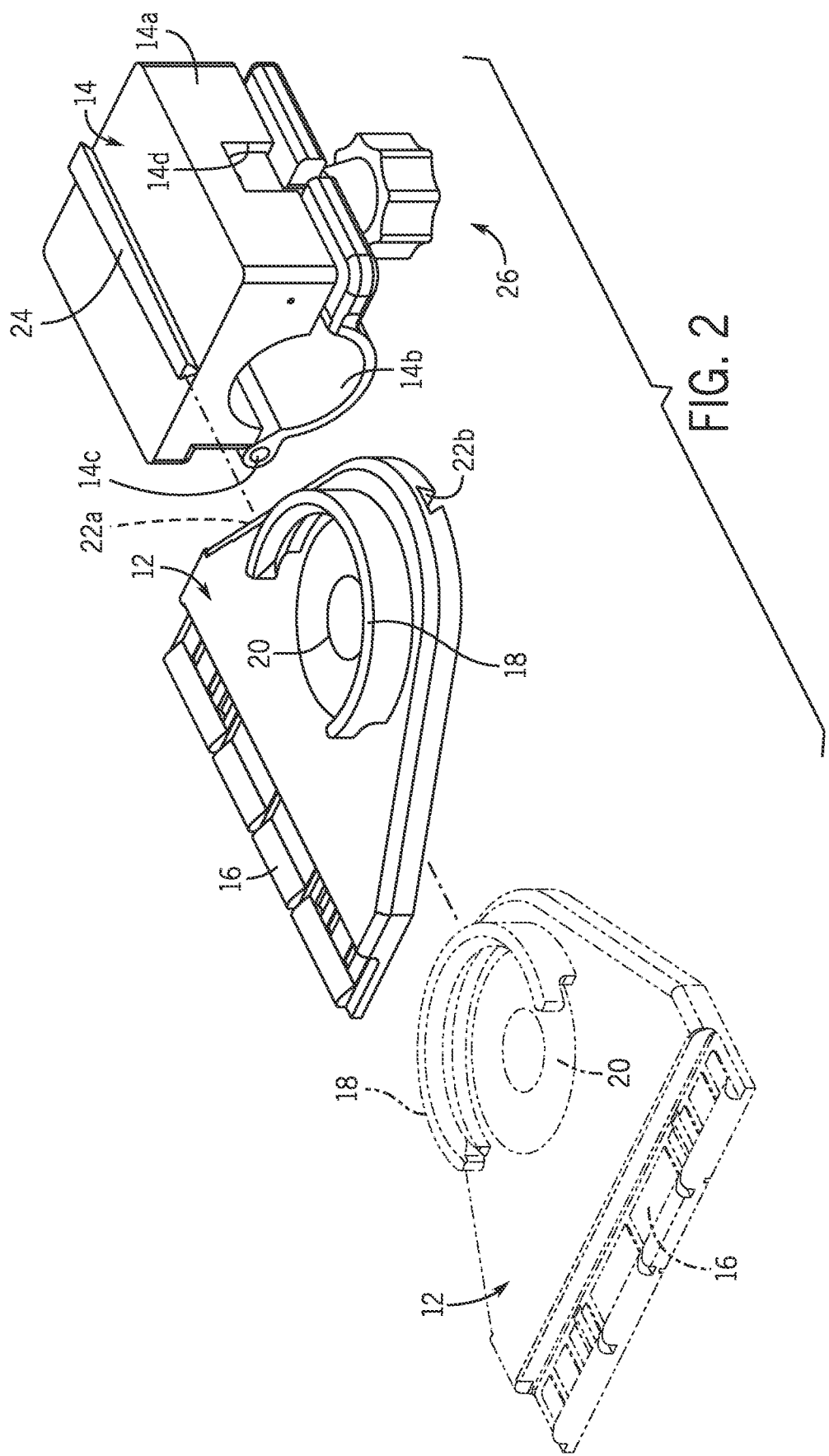
FIG. 2 is an exploded perspective view of an exemplary embodiment of the present invention.
Figure 3:
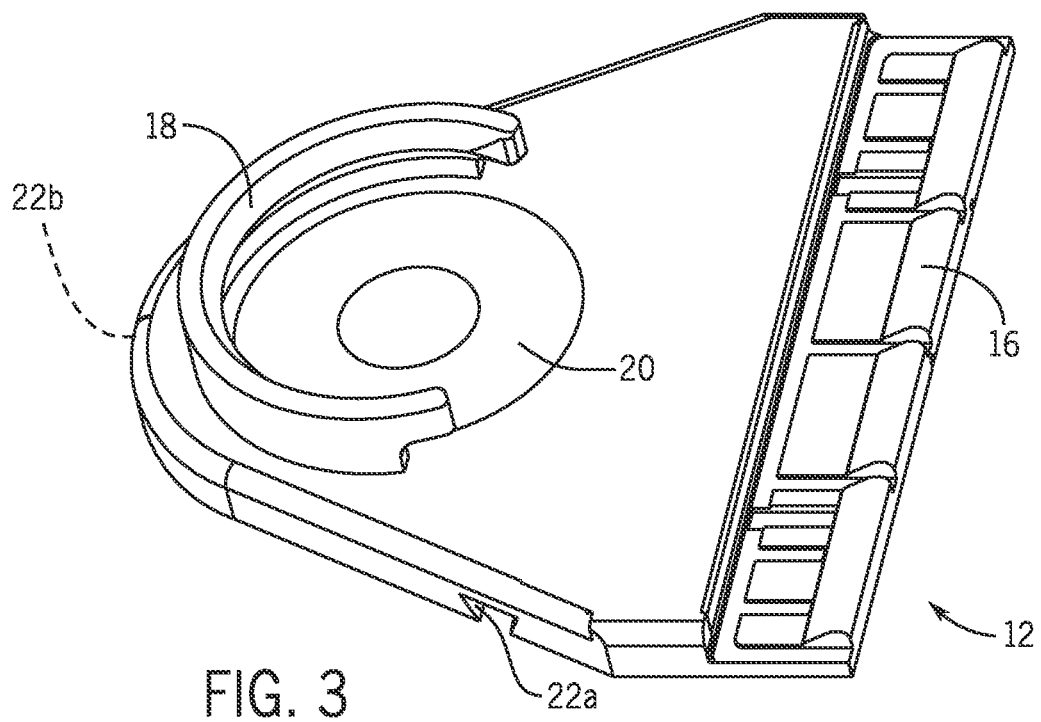
FIG. 3 is a top perspective view of an exemplary embodiment of a mounting plate of the present invention.
Figure 4:
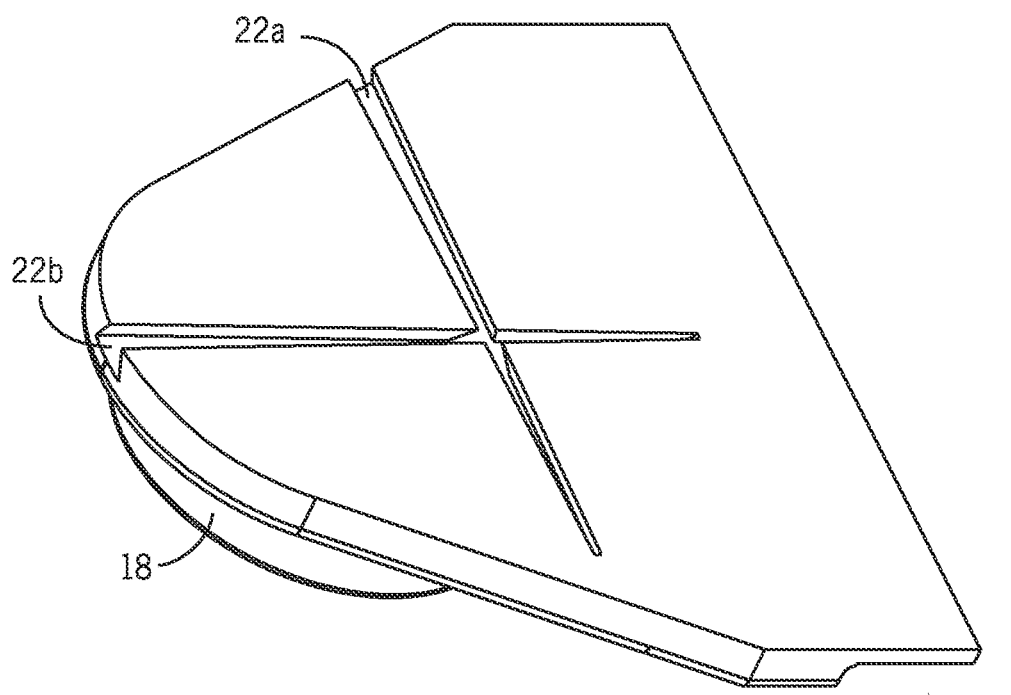
FIG. 4 is a bottom perspective view of an exemplary embodiment of the mounting plate of the present invention.
Figure 5:
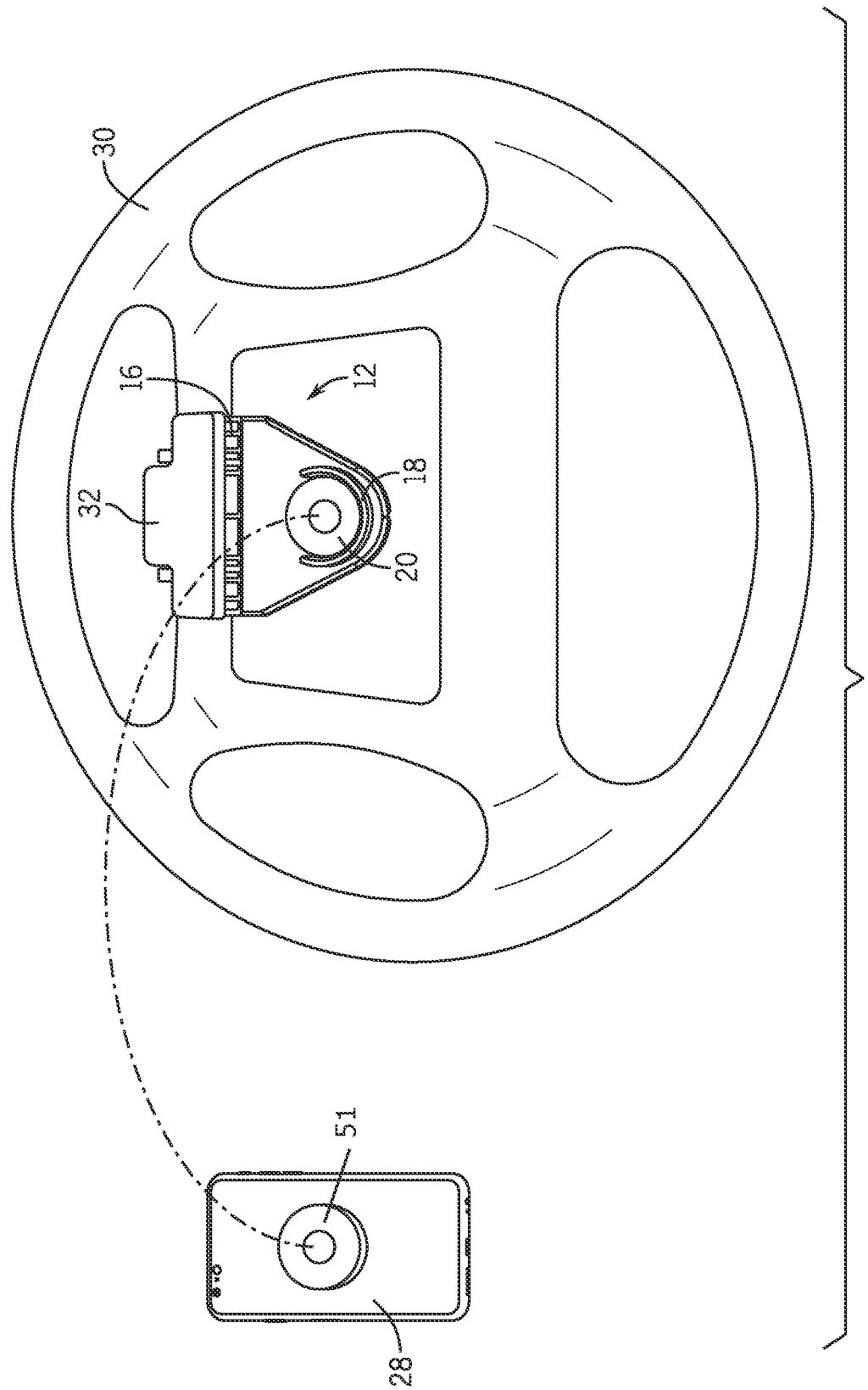
FIG. 5 is a top exploded clamshell perspective view of an exemplary embodiment of a mounting plate of the present invention.
Figure 6:
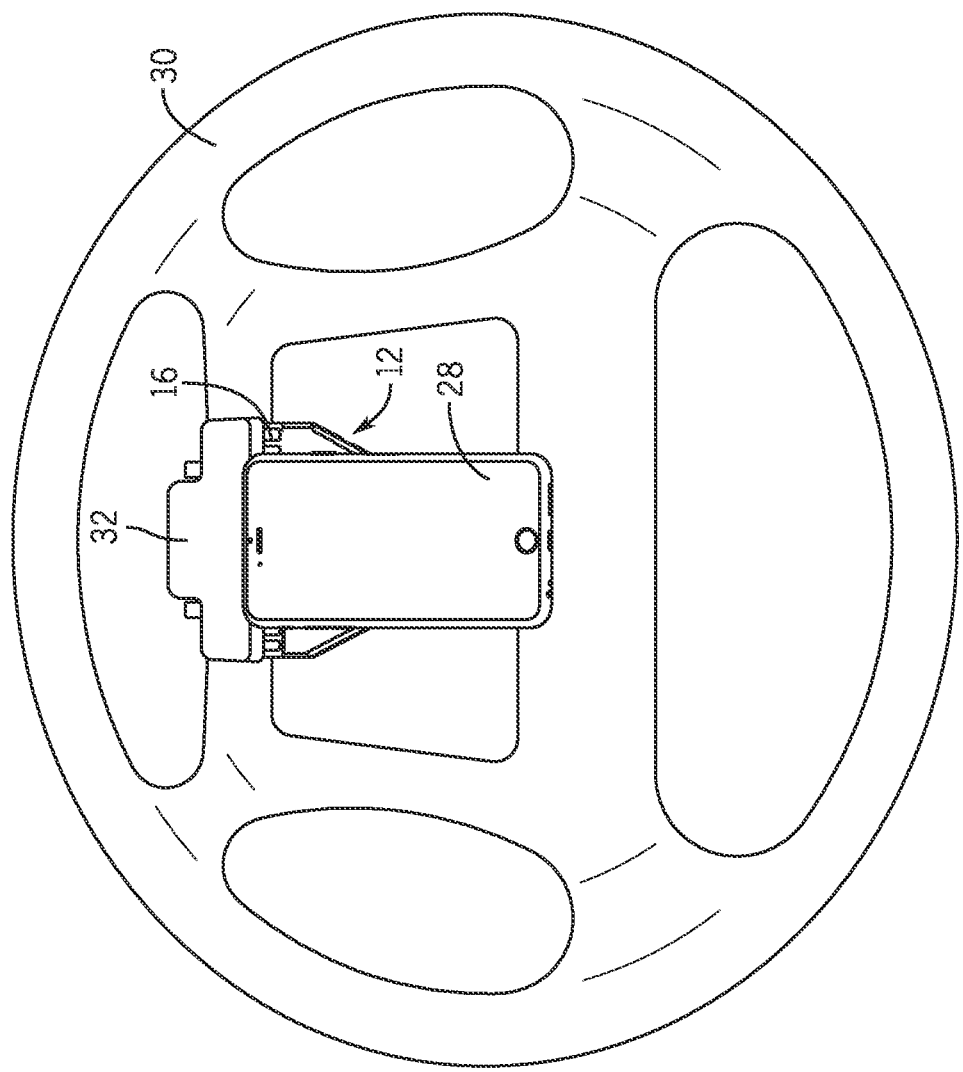
FIG. 6 is a top perspective view of an exemplary embodiment of a mounting plate of the present invention, shown in use.
Figure 7:
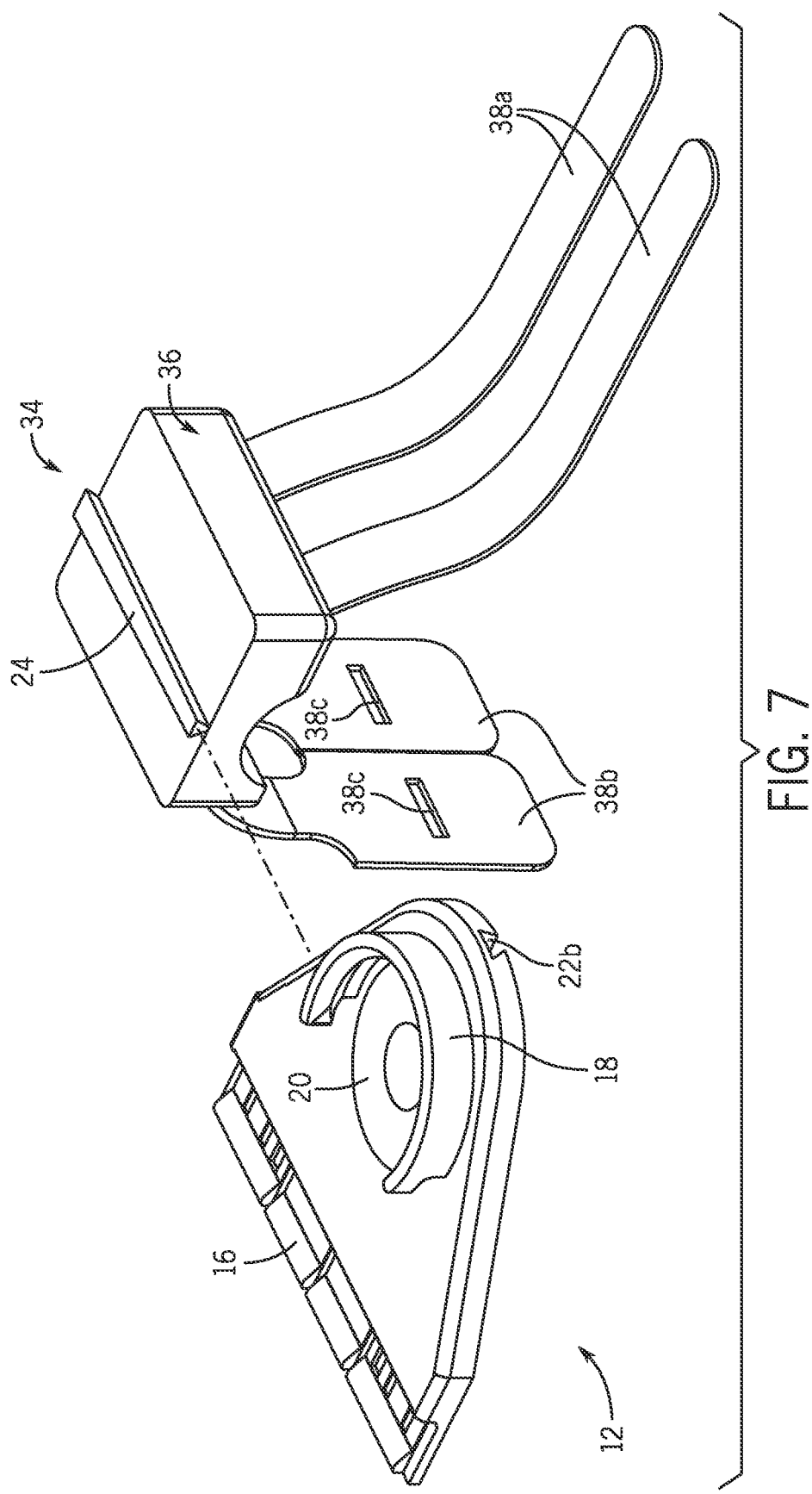
FIG. 7 is a front perspective view of an exemplary embodiment of a mounting plate of the present invention.
Figure 8:
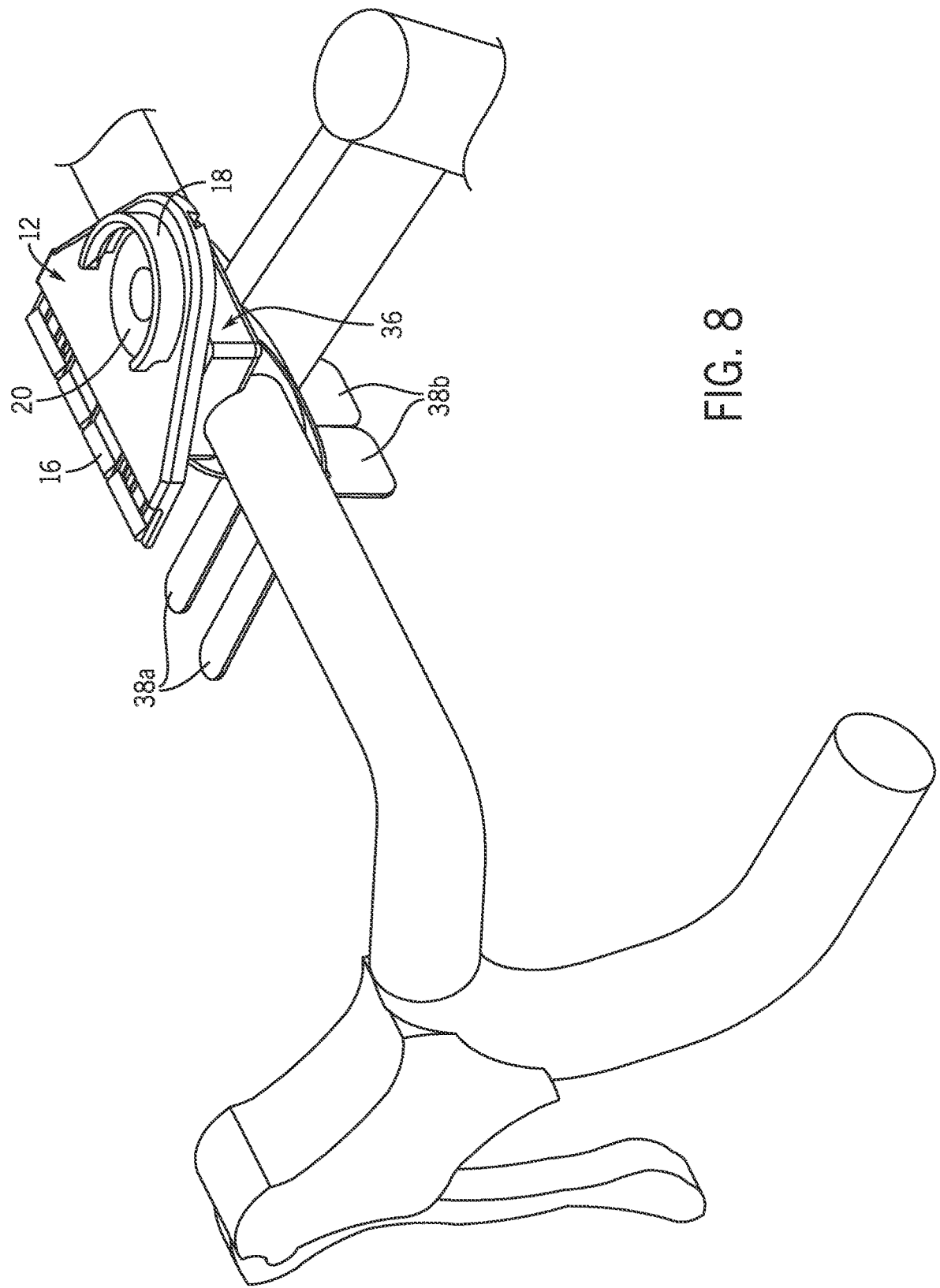
FIG. 8 is a front perspective view of an exemplary embodiment of the mounting plate of FIG. 7, shown in use.
Figure 9:
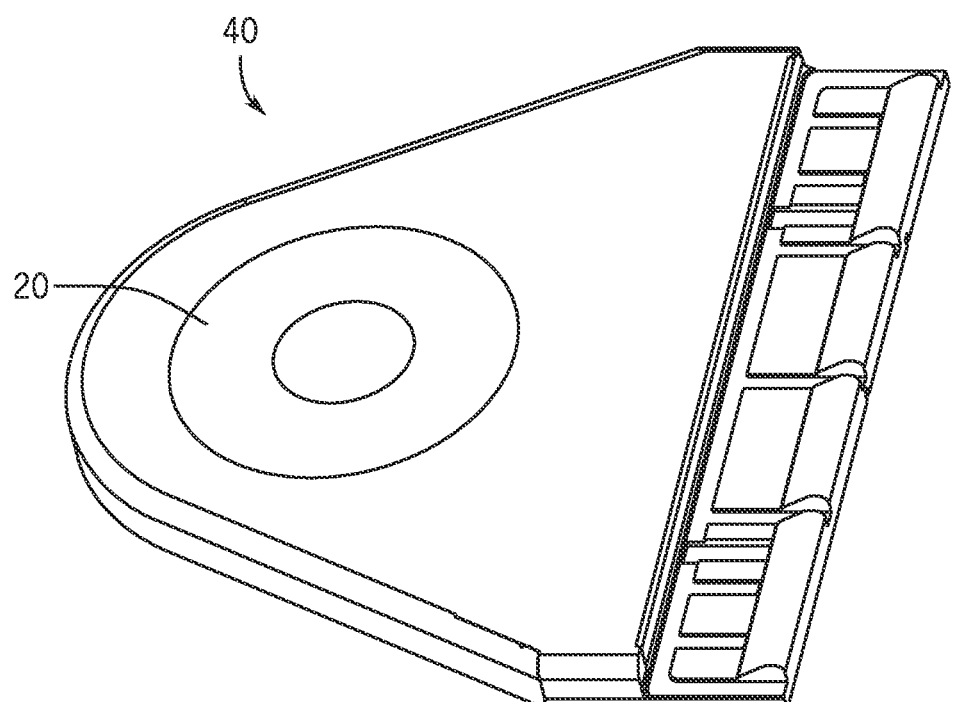
FIG. 9 is a top perspective view of an exemplary embodiment of a mounting plate of the present invention.

An outward-facing surface of the upper portion 14a of the mounting bracket 14 may have a tapered dovetail 24, as illustrated in FIG. 2. Each mounting plate 12/40/42 may include a first/lower surface having two tapered dovetail grooves 22a and 22b having a transverse orientation relative to each other, permitting the tapered dovetail 24 to selectively slide into either groove 22a or 22b for orienting the mounting plate 12/40/42 relatively the mounting bracket 14 in at least two different orientations.

The mounting bracket 14 may be two molded parts assembled with the pivot pin 14c for securing around the second object 30 (e.g., target cylindrical object).

The mounting bracket 34 may be a unitary (in certain embodiments molded) body 36 with two fabric hook and loop/latch straps 38a-c slotted through the body 36. The loop/latch straps may include a receiving end 38a and spaced apart strap receivers 38b having slots 38c for slidably receiving the receiving end 38a, wherein the loop/latch straps can wrap about the second object 30 and be secured by the slots 38c. The body 36 may also provide the tapered dovetail 24 as disclosed above.

Figure 13:
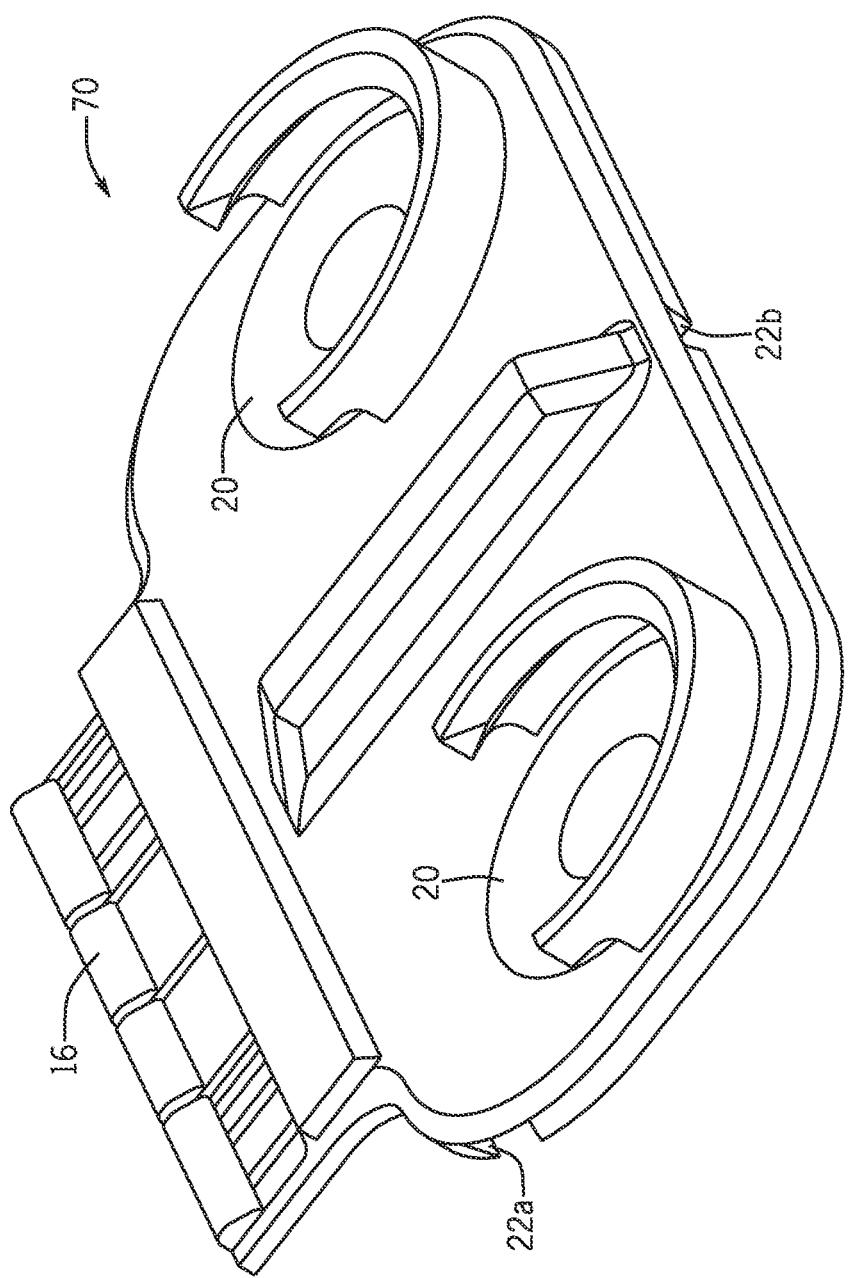
FIG. 13 is an exploded perspective view of an exemplary embodiment of a dual configuration of the present invention.

A retention ring 18 and/or a ferromagnetic portion 20 may be provided along a second/upper surface (opposite the first/lower surface) of the mounting plate 12/40/42. The retention ring 18 may be dimensioned and adapted to engage a portion of a periphery of either the extendible grip 51 or a third magnetic component 80. In dual embodiment 70, are pair of retention rings 18 and ferromagnetic portions 20 may be provided along the second/upper surface, as illustrated in FIG. 13.

Figure 10:
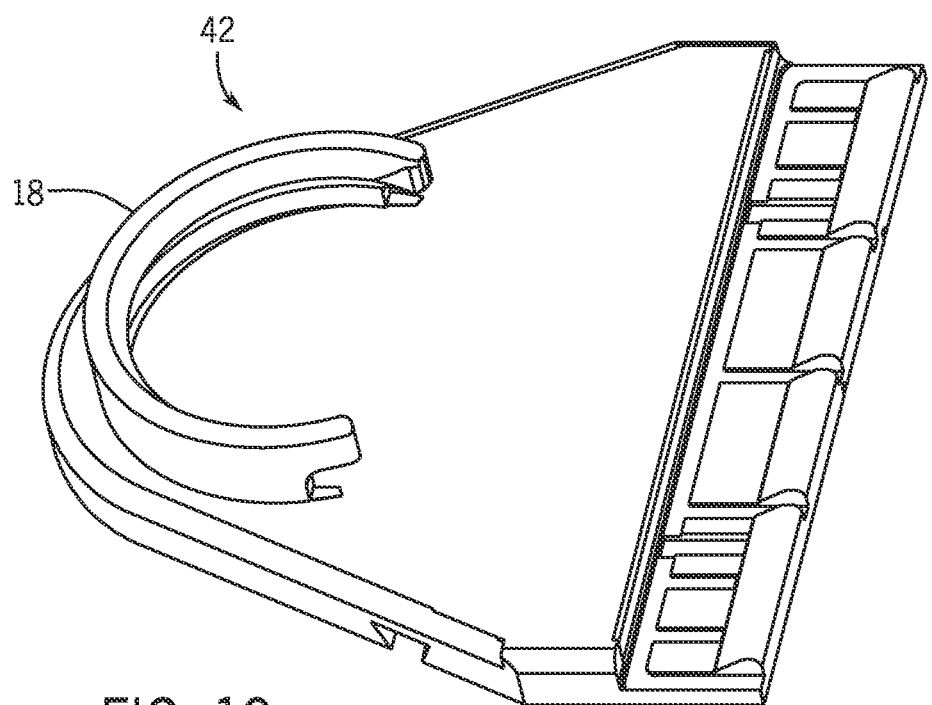
FIG. 10 is a top perspective view of an exemplary embodiment of a mounting plate of the present invention.

Mounting plates 12, 40, and 42 may be manufactured through injection molded parts. For mounting plate 42, which has only the retention ring 18, as illustrated in FIG. 10, only the molded part may be needed. For mounting plates 40 and 12 a ferromagnetic ring or disk would be secured in the molded part either by force fit or contact adhesive 55. The mounting plates 12 and 40 with the ferromagnetic portion 20 enable the attachment of magnetized components 50, 60 and 80 or other object with embedded margents.

Figure 11:
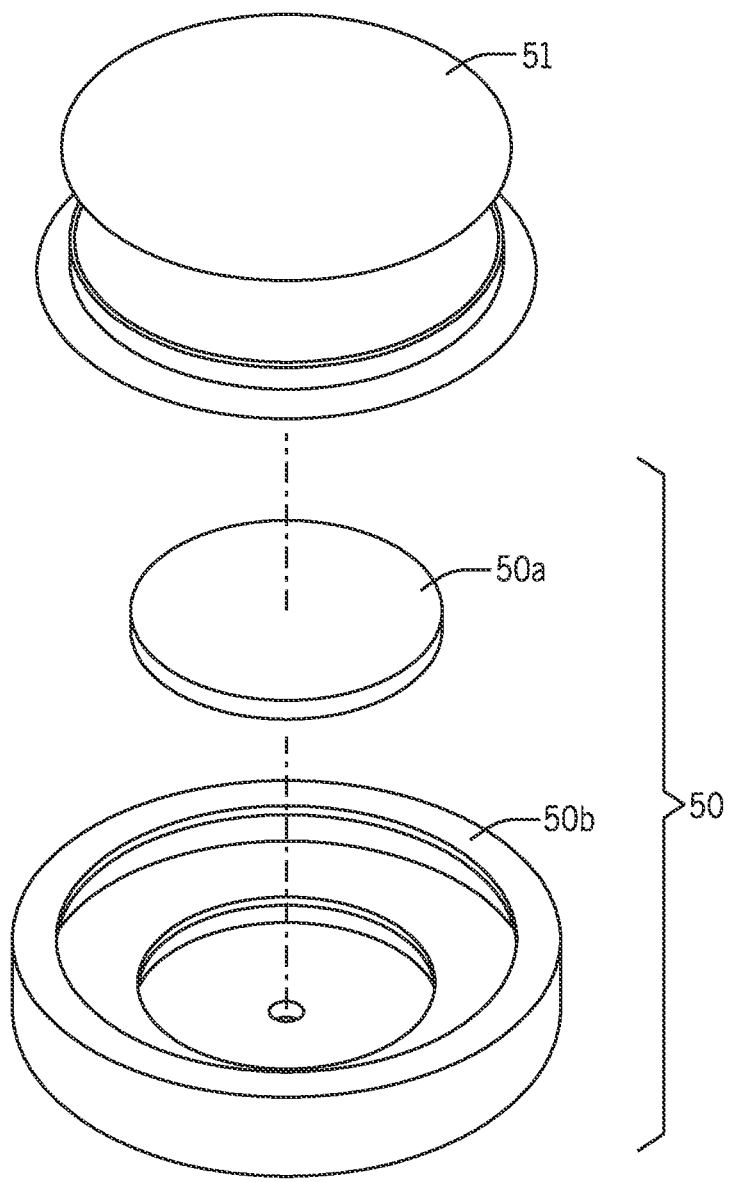
FIG. 11 is an exploded perspective view of an exemplary embodiment of a mounting plate of the present invention.

The first magnetic component 50 may provide a rare earth magnet 50a coupled to a removable cover 50b to attach to the extensible grip 51, as illustrated in FIG. 11, wherein the assembly associates with the ferromagnetic portion 20. The first magnetic component 50 may be manufactured as an injection-molded removable cover sized to fit over the foot of an extensible grip 51. The magnet 50a may be a high-strength rare earth disk magnet. As a result, the extensible grip 51 may be removably attached to the mounting plates 12 or 40, by way of the ferromagnetic portion 20.

Figure 12:
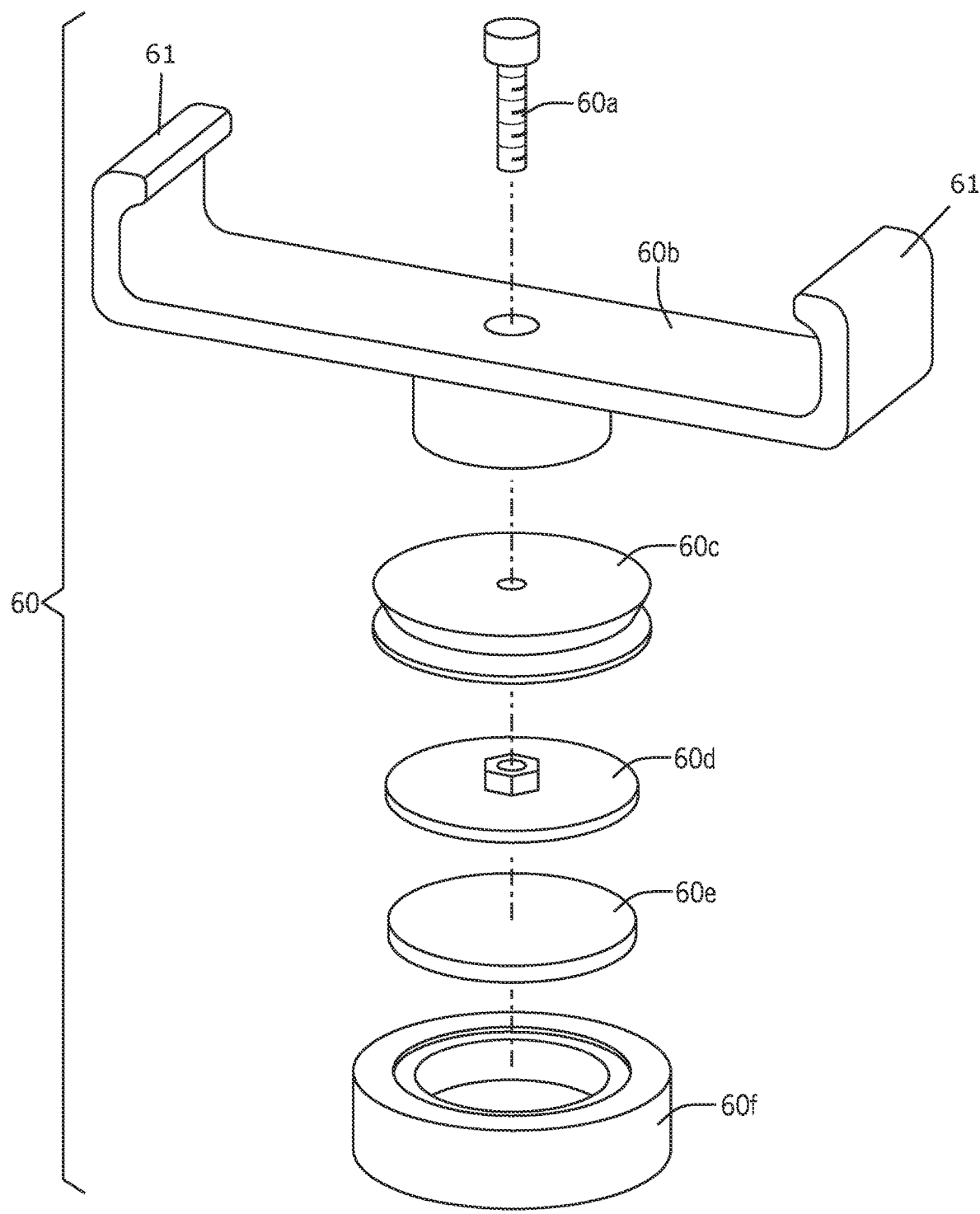
FIG. 12 is an exploded perspective view of an exemplary embodiment of a gripper arm configuration 60 of the present invention.
Figure 14:
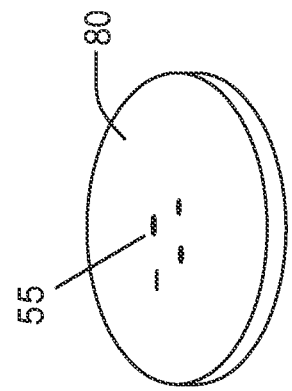
FIG. 14 is a perspective view of an exemplary embodiment of the present invention, illustrating modification of an extensible grip to permit attachment to a ferromagnetic surface.

The second magnetized components 60 may be a gripper arm configuration providing the following: a fixed or moving gripping arm 60b; a backing flange 60c with a lip to receive a flexible cover 60f; a ferromagnetic backing plate 60d; and a magnetic base 60e. The gripping arm 60b, the backing flange 60c, and the ferromagnetic backing plate 60d may be threaded to receive a threaded bolt 60a or other fastener to join such elements as illustrated in FIG. 12. The flexible cover 60f may receive the magnet base 60e and secure to the lip of the backing flange 60c. The gripping arm 60b may be sized to hold the mobile device 28 between the pair of "fingers" 61.

In certain embodiments, the gripping arm 60b may be movable through sliding, spring-loaded, and/or expandable jaws. In short, the gripping arm 60b can be manufactured to a variety of designs.

The third magnetized components 80 may be high-strength disk magnet 80 with one surface treated with a contact adhesive 55 may be permanently attached to a commercially available extensible mobile device grip. The high-strength disk magnet 80 may be manufactured by coating one side of a strong disk-shaped rare earth magnet with the strong contact adhesive 55. The opposite face may be coated with a plastic protect film and a custom design.

Connecting the first object 28 to the second object 30 can be accomplished either through the mounting bracket 14 or 34 being attached to the mounting plate 12, 40, or 42 using one of the slots 22a or 22b in the rear face. The orientation of the slot 22a/22b used depends on how the mounting bracket 14 or 34 needs to be oriented on the second object 30.

If the mobile device 28 does not contain a magnet or has an extensible grip 51 installed, the second magnetic component 60 gripping arm configuration may be employed to hold the mobile device 28 with the extendible grip 51.

If the mobile device 28 has an extensible grip 51 attached and it is desired to use mounting plate 40 then the first or third magnetic component 50 or 80 may be attached to the extensible grip 51 so that the magnetic attachment can be used.

Note that the first, second, and third magnetic components 50, 60, and 80 may be used to attach the mobile device to a flat ferromagnetic surface if desired.

The mounting plates 12 and 40 can be used with any combination of first, second, and third magnetic components 50, 60, and 80. The mounting plates 12, 40 and 42 can be used with either mounting bracket 14 or 34.

In a golfing setting, a scorecard clip 16 may be provided by the mounting plates 12, 40 and 42 for mounting under the score card clip 32 of a golf cart steering wheel. The upper edge of the mounting plate 16 is shaped to fit the most popular golf carts score card clips 32. Thus, no mounting bracket 14 or 34 is required to facilitate the connection of the first object 28 to the second object (golf cart steering wheel).

Additionally, as mentioned above, although the retaining assembly 10 was originally intended for golfer it may be employed to attach mobile devices to other forms of transport or to a suitable location around the house. For example, using the gripper arm configuration 60, a mobile device 28 may be attached to a refrigerator, cooking hood, tool chest, car dashboard, etc. Similarly, if the mobile device 28 has an extensible grip 51 attached, either magnetic components 50 and 80 permit attachment to any suitable flat, ferromagnetic surface.

It should be understood by those skilled in the art that the use of directional terms such as upper, lower, upward, downwardly, top, and the like are used in relation to the illustrative embodiments as they are depicted in the figures, the upward (or upper) direction being toward the top of the corresponding figures, the downward (or lower) direction being toward the bottom of the corresponding figures.

It should be understood, of course, that the foregoing relates to exemplary embodiments of the invention and that modifications may be made without departing from the spirit and scope of the invention as set forth in the following claims.

What is claimed is:

1. A retaining assembly for one or more mobile devices fitted with an extensible grip, comprising:
    a mounting plate providing:
        at least one ferromagnetic portion or a retaining ring along an upper surface, wherein the retaining ring is configured to engage a portion of a periphery of the extensible grip, and wherein each ferromagnetic portion is configured to magnetically connect to the extensible grip through one of a plurality of magnetized components; and
        two tapered dovetail grooves along a lower surface thereof, wherein each tapered dovetail groove has a transverse orientation relative to each other and wherein each tapered dovetail groove is configured to receive the tapered dovetail;
    a mounting bracket including a tapered dovetail; and
    a second magnetized component of the plurality of magnetized components the second magnetized component comprising:
        a magnet coupled to a grip configuration; and
        the grip configuration having a pair of spaced apart fingers for engaging a periphery of one mobile device.

2. The retaining assembly of claim 1, further comprising a first magnetized component of the plurality of magnetized components:
    the first magnetized component comprising a magnet coupled to a distal end of the extensible grip by way of a removable cover.

3. The retaining assembly of claim 1, further comprising a third magnetized component of the plurality of magnetized components:
    the third magnetized component comprising a magnet with one surface thereof having a contact adhesive fixed to the extensible grip.

4. The retaining assembly of claim 1, wherein each tapered dovetail groove is configured to receive the tapered dovetail.

5. The retaining assembly of claim 4, wherein the mounting plate provides a pair of ferromagnetic portions and retaining rings, wherein each retaining ring partially circumscribes the respective ferromagnetic portion.

6. The retaining assembly of claim 4, wherein the mounting plate provides one ferromagnetic portion and one retaining ring, wherein said retaining ring partially circumscribes said ferromagnetic portion.

7. The retaining assembly of claim 1, wherein the mounting plate provides a pair of ferromagnetic portions and retaining rings, wherein each retaining ring partially circumscribes the respective ferromagnetic portion.

8. The retaining assembly of claim 1, wherein the mounting plate provides one ferromagnetic portion and one retaining ring, wherein said retaining ring partially circumscribes said ferromagnetic portion.

\* \* \* \* \*